(12) United States Patent
Herremans et al.

(10) Patent No.: US 8,418,565 B2
(45) Date of Patent: Apr. 16, 2013

(54) HEATED PIPE CONNECTING DEVICE FOR INSTALLATION OF A FLOW METER

(75) Inventors: Pieter Herremans, Giessenburg (NL); Alexander Marnix Heijnsdijk, Papendrecht (NL)

(73) Assignee: Krohne AG, Basel (CH)

( * ) Notice: Subject to any disclaimer, the term of this patent is extended or adjusted under 35 U.S.C. 154(b) by 882 days.

(21) Appl. No.: 11/427,599

(22) Filed: Jun. 29, 2006

(65) Prior Publication Data
US 2008/0011098 A1    Jan. 17, 2008

(51) Int. Cl.
*G01F 1/00* (2006.01)
*F16L 13/00* (2006.01)

(52) U.S. Cl.
USPC ........................... 73/861; 285/21.2

(58) Field of Classification Search .......... None
See application file for complete search history.

(56) References Cited

U.S. PATENT DOCUMENTS

| | | | | |
|---|---|---|---|---|
| 2,454,666 A | * | 11/1948 | Morris | 425/14 |
| 3,061,503 A | * | 10/1962 | Gould et al. | 156/274.2 |
| 3,062,940 A | * | 11/1962 | Holzer et al. | 219/544 |
| 3,094,452 A | * | 6/1963 | Von Riegen et al. | 156/274.2 |
| 3,506,519 A | * | 4/1970 | Blumenkranz | 156/274.2 |
| 3,788,928 A | * | 1/1974 | Wise | 156/294 |
| 3,849,630 A | * | 11/1974 | Halliday | 219/535 |
| 3,943,334 A | * | 3/1976 | Sturm | 219/544 |
| 3,987,276 A | * | 10/1976 | Vogelsanger et al. | 219/535 |
| 4,090,899 A | * | 5/1978 | Reich | 156/79 |
| 4,136,692 A | * | 1/1979 | Goldowsky | 604/251 |
| 4,176,274 A | * | 11/1979 | Lippera | 219/522 |
| 4,530,521 A | * | 7/1985 | Nyffeler et al. | 285/21.2 |
| 4,770,442 A | * | 9/1988 | Sichler | 285/21.2 |
| 4,852,914 A | * | 8/1989 | Lyall | 285/21.2 |
| 4,906,313 A | * | 3/1990 | Hill | 156/158 |
| 5,113,690 A | * | 5/1992 | van Nistelrooij et al. | 73/861.12 |
| 5,269,191 A | * | 12/1993 | Wada | 73/861.12 |
| 5,358,288 A | * | 10/1994 | Lindner et al. | 285/288.1 |
| 5,540,103 A | * | 7/1996 | Zingg | 73/861.12 |
| 6,131,954 A | * | 10/2000 | Campbell | 285/21.1 |
| 6,758,104 B2 | * | 7/2004 | Leys et al. | 73/861.57 |
| 6,973,705 B2 | * | 12/2005 | Leys et al. | 29/593 |

FOREIGN PATENT DOCUMENTS

| | | |
|---|---|---|
| AU | B-24838/95 | 1/1996 |
| GB | 2 296 568 A | 7/1996 |
| GB | 2 402 219 A | 12/2004 |
| JP | 2001-349478 | 12/2001 |
| WO | WO 2005/024353 A1 | 3/2005 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A flow meter for measuring the flow rate of a flowing medium has a plastic measurement tube for routing the medium and a connecting device for connecting an end of the measurement tube to an end of a plastic pipeline. So that measurement tube of plastic can be connected easily and to the plastic pipeline, the connecting device is formed by a heating means that is integrated into an inner wall of the end of the measurement tube and that melts at least the end of the measurement tube to thereby form a melted connection between the measurement tube and the pipeline.

8 Claims, 2 Drawing Sheets

HEATED PIPE CONNECTING DEVICE FOR INSTALLATION OF A FLOW METER

BACKGROUND OF THE INVENTION

1. Field of the Invention

The invention relates to a flow meter for measuring the flow rate of a flowing medium, with a plastic measurement tube for routing the medium and a connecting means for connecting one end of the measurement tube to one end of a plastic pipeline.

2. Description of Related Art

Flow meters for measuring the flow rate of a flowing medium are known in diverse versions. Measurement of a volumetric flow is possible, for example, by means of magnetic-inductive flow meters with which the electromagnetic induction of charge carriers moving through a magnetic field is used. The underlying principle of a magnetic-inductive flow meter for flowing media goes back to Faraday who suggested in 1832 that the principle of electromagnetic induction be used for measuring flow velocity.

According to the Faraday induction law, in a flowing medium which is entraining charge carriers and which is flowing through a magnetic field, an electrical field intensity is formed perpendicular to the flow direction and perpendicular to the magnetic field. The Faraday induction law is used in a magnetic-inductive flow meter in that by means of a magnetic coil a magnetic field is generated which has a magnetic field component which runs perpendicular to the flow direction. Within this magnetic field, each volumetric element of the flowing medium which has a certain number of charge carriers and which is moving through the magnetic field with the field intensity which forms in this volumetric element contributes to a measurement voltage which can be tapped via measurement electrodes.

The measurement electrodes in the known magnetic-inductive flow meters are made such that they are coupled either galvanically or capacitively to the flowing medium. Furthermore, one special feature of magnetic-inductive flow meters is the proportionality between the measurement voltage and the flow velocity of the medium averaged over the cross section of the measurement tube, i.e. between the measurement voltage and volumetric flow.

At least in the region of the measurement electrodes, it is necessary for the inner region of the measurement tube to be electrically insulating or to have an electrically insulating lining. To do this, a corresponding insert or a corresponding coating of the measurement tube can be used. However, it is also possible to produce the entire measurement tube from plastic, which simplifies production.

Magnetic-inductive flow meters, but also other flow meters with plastic measurement tubes, are often to be installed in pipeline systems which, likewise, are made of plastic. To do this, screwed or clamped flange connections are often used.

Australian Patents AU 684166 B2 and AU 2483895 disclose connecting two pipelines which have plastic ends and which are used, for example, as pipes for gas or water meters by means of a connecting device, this connecting device producing a corresponding weld/melt connection for this purpose by means of heat, specifically, via corresponding heating wires. Furthermore, Japanese patent application publication JP 2001-349478 A discloses connecting a gas flow meter to a metal pipe via a plastic weld connection.

SUMMARY OF THE INVENTION

The object of the invention is a flow meter of the above mentioned type with which a measurement tube of plastic can be connected easily and reliably to a likewise plastic pipeline system.

Proceeding from the initially described flow meter, the aforementioned object is achieved in that the connecting device has a heating means, with which the end of the measurement tube and/or the end of the pipeline can be melted so that a melted connection can be attained between the measurement tube and the pipeline, the measurement tube and the connecting device being made in one piece and the heating means being integrated into the wall of the measurement tube.

Therefore, it is critical to the invention for the measurement tube to be installed in the pipeline system by way of a melt connection, which is defined as at least the plastic of the measurement tube or the plastic of the pipeline being melted, preferably both the plastic of the measurement tube and also the plastic of the pipeline being melted, and afterwards the measurement tube and the pipeline coming into contact with one another in the area of melting so that, after cooling and setting of the plastic, a fixed connection is attained between the measurement tube and the pipeline, specifically the so-called melt connection.

To install the flow meter, the measurement tube with the connecting device is plugged onto the pipeline, and after activation of the heating means, the plastic is melted; this ultimately leads to the above described melt connection.

The heating means can be a plurality of means with which the plastic can be melted. Thus, heating means are conceivable which are based on an exothermal chemical reaction or which use, for example, a hot medium, such as a hot gas. However, according to one preferred development of the invention, it is provided that the heating means is a heating wire.

To install the flow meter in the pipeline system, simply the heating wire need be electrically connected so that a fixed connection of the measurement tube with the pipeline can be achieved quickly and extremely easily.

The plastics for the measurement tube and/or the connecting device are preferably polyethylene and/or polypropylene. The choice of possible plastics can depend especially on the type of plastic of the pipeline system, and fundamentally, all plastics can be used with which a corresponding melt connection can be achieved.

In particular, there are a host of possibilities for embodying and developing the flow meter as claimed in the invention. In his respect reference is made to the following detailed description of a preferred exemplary embodiment of the invention in conjunction with the accompanying drawings.

DETAILED DESCRIPTION OF THE INVENTION

Figure 1:
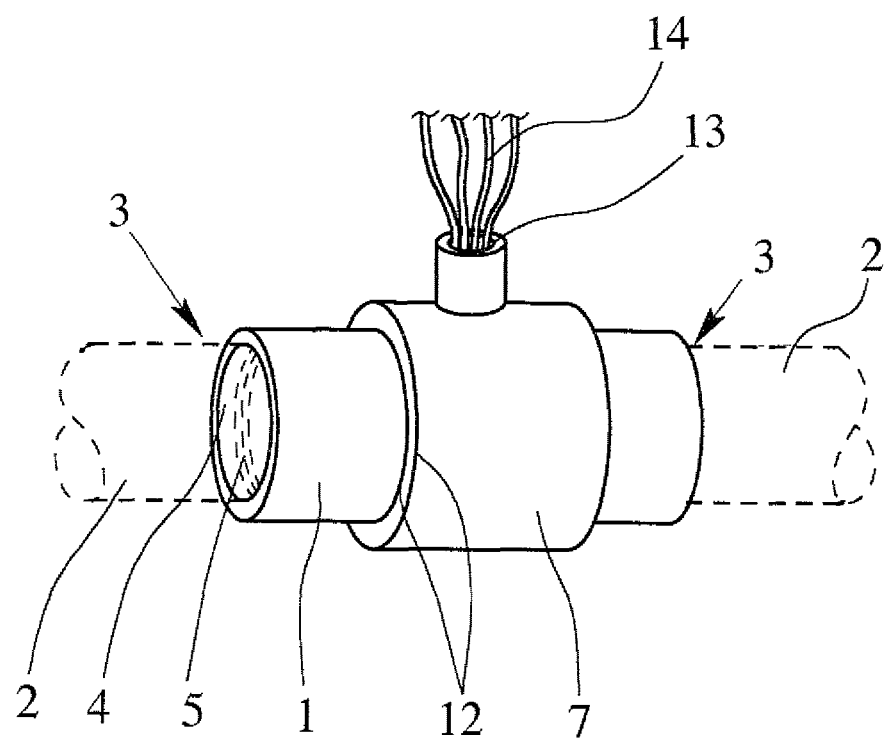
FIG. 1 is a side view of a magnetic-inductive flow meter according to a preferred exemplary embodiment of the invention.
Figure 2:
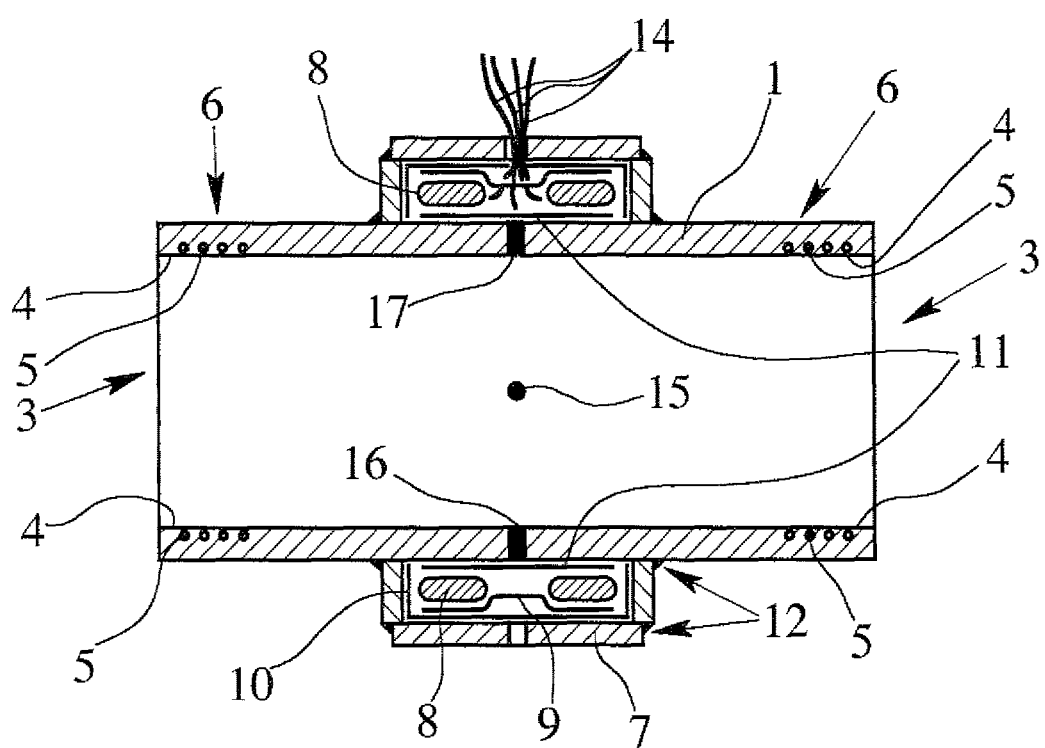
FIG. 2 is a sectional view of a magnetic-inductive flow meter according to the preferred exemplary embodiment of the invention.

FIG. 1 shows a magnetic-inductive flow meter according to a preferred exemplary embodiment of the invention having a measurement tube 1 of polyethylene (PE) which is to be connected to two pipelines 2 which likewise are made of PE. Additionally, the measurement tube 1 has a heating means 5 in the inside wall 4 of each its two ends 3, specifically, in the form of heating wires integrated within the inner wall 4 is apparent from FIG. 2.

To install the magnetic-inductive flow meter according to the preferred exemplary embodiment of the invention, the two pipelines 2, which are also made of polyethylene, are inserted into the ends 3 of the measurement tube 1, and an electrical current is supplied to the heating means 5 via electrical terminals (not shown). Thus, both the plastic in the area of the inside wall 4 on the ends 3 of the measurement tube 1 are melted, and the plastic of the pipelines 2. After cooling and setting of the plastic, thus between the measurement tube 1 and the pipelines 2, a melt connection is achieved which is both very durable and also both liquid-tight and gas-tight. In this preferred exemplary embodiment, to connect the pipelines 2 to the measurement tube 1, therefore, there are connecting devices 6 which are made integrally with the measurement tube 1.

Otherwise, the magnetic-inductive flow meter according to the preferred exemplary embodiment of the invention is made as follows: An outer housing 7 is placed on the measurement tube 1 and has a magnetic coil 8, a magnetic circuit 9 and a magnetic shield 10 and an electrical shield 11. The outer housing 7 is also made of polyethylene and is assembled and connected to the measurement tube 1, here, by means of welds 12. Alternatively, this can also be done by means of cementing.

Electrical lines 14, which are used to supply the magnetic fields 8 and which lead to the electrodes 15, 16, 17, are supplied to the magnetic-inductive flow meter according to the first preferred exemplary embodiment of the invention via an opening 13 in the outer housing 7. The electrodes 15-17 are melted into the wall of the measurement tube 1 such that they come into galvanically conductive contact with the medium which is routed in the measurement tube 1. While the electrode 15 and another electrode which is opposite it (not shown) are used to tap the voltage induced in the medium which is being routed in the measurement tube 1, the electrode 16 is used as a ground electrode and the electrode 17 is used to detect an incompletely filled measurement tube 1.

The remaining space in the outer housing 7 is not further filled here. However, it can be advantageous to fill this space with a potting material such as epoxy, polyurethane or silicone. In addition to hard-setting materials, also materials which are sponge-like in the cured state are suitable.

What is claimed is:

1. Flow meter for measuring the flow rate of a flowing medium, comprising:
   a plastic measurement tube for routing the medium,
   a magnetic-inductive flow meter having a plastic outer housing, a magnetic coil, a magnetic circuit, a magnetic shield and an electrical shield, and being mounted on the measurement tube, and
   a connecting device for connecting an end of the measurement tube to an end of a plastic pipeline,
   wherein the connecting device comprises a heating means for melting at least the end of the measurement tube and forming a melted connection between the measurement tube and a pipeline inserted therein, in use, wherein the heating means is integrated into an inner wall of the end of the measurement tube; and wherein the inner wall of the measurement tube into which the heating means is integrated is an exposed inner surface thereof which, in use, adjoins a pipeline inserted therein.

2. Flow meter as claimed in claim 1, wherein the heating means is a heating wire.

3. Flow meter as claimed in claim 2, wherein the plastic of at least one of the measurement tube and the connecting device is selected from the group consisting of polyethylene and polypropylene.

4. Flow meter as claimed in claim 1, wherein the plastic of at least one of the measurement tube and the connecting device is selected from the group consisting of polyethylene and polypropylene.

5. Flow meter as claimed in claim 1, wherein the heating means is integrated into each of opposite ends of the measurement tube for forming, in use, a melted connection with a respective pipeline inserted therein.

6. Flow meter as claimed in claim 5, wherein the heating means is a heating wire.

7. Flow meter as claimed in claim 1, wherein electrodes embedded in the wall of the measurement tube at spaced locations thereabout in a manner enabling the electrodes to come into galvanically conductive contact with a medium routed through the measurement tube.

8. Flow meter as claimed in claim 1, wherein a said connecting device is provided at each of opposite ends of the measurement tube.

* * * * *